United States Patent [19]
Glance

[11] Patent Number: 4,989,201
[45] Date of Patent: Jan. 29, 1991

[54] OPTICAL COMMUNICATION SYSTEM WITH A STABILIZED "COMB" OF FREQUENCIES

[75] Inventor: Bernard Glance, Colts Neck, N.J.

[73] Assignee: AT&T Bell Laboratories, Murray Hill, N.J.

[21] Appl. No.: 455,898

[22] Filed: Dec. 21, 1989

Related U.S. Application Data

[63] Continuation of Ser. No. 346,255, May 1, 1989, abandoned, which is a continuation of Ser. No. 59,973, Jun. 9, 1987, abandoned.

[51] Int. Cl.$^5$ .................. H04J 14/02; H04B 10/04
[52] U.S. Cl. .................................. 370/3; 350/96.16; 372/32; 455/618
[58] Field of Search ............... 350/96.15, 96.16; 370/1, 3; 372/18, 20, 29, 32; 455/606, 607, 612, 617, 609, 610, 611, 613, 618

[56] References Cited

U.S. PATENT DOCUMENTS 4,707,061 11/1987 McMahon .................. 350/96.16
4,861,136 8/1989 Stone ........................... 350/96.15

OTHER PUBLICATIONS

"Ten-Channel Coherent Optical Fibre Transmission", *Electronics Letters*, vol. 22, No. 19, Sep. 1986, pp. 1002-1003, E. J. Bachus et al.

"Reduction of Optical Phase Noise in Semiconductor Lasers", *Electronics Letters*, vol. 18, No. 8, Apr. 15, 1982, pp. 336-337, K. w. Cobb et al.

"Frequency Stabilisation of Semiconductor Lasers for Heterodyne-Type Optical Communication Systems", *Electronics Letters*, vol. 16, No. 5, Feb. 28, 1980, pp. 179-181, T. Okoshi et al.

"Frequency Stabilization of Semiconductor Lasers for Applications in Coherent Communication Systems", *Journal of Lightwave Technology*, vol. LT-5, No. 4, Apr. 1987, pp. 485-491, A. Sollberger et al.

"Frequency-Locking of External Cavity Semiconductor Lasers Using an Optical Comb Generator", *Electronics Letters*, vol. 22, No. 7, Mar. 27, 1986, pp. 388-389, D. J. Hunkin et al.

"Narrowband Tunable Optical Filter for Channel Selection in Densely Packed WDM Systems", *Electronics Letters*, vol. 22, No. 20, Sep. 25, 1986, pp. 1084-1085, A. R. Chraplyvy et al.

"Multichannel Coherent Optical Communications Systems" and Beyond Gigabit-Per-Second Transmission Rates, *Optical Fiber Communication Conference and Sixth International Conference*, Reno, Nev., Jan. 19-22, 1987, Tech. Digest, pp. 184-185. R. A. Linke.

"Fast Frequency-Tunable External-Cavity Laser", *Electronics Letters*, vol. 23, No. 3, Jan. 29, 1987, pp. 98-99, B. Glance et al.

"10 kHz Linewidth 1.5 μm InGaAsP External Cavity Laser with 55 nm Tuning Range", *Electronics Letters*, vol. 19, No. 3, Feb. 3, 1983, pp. 110-112, R. Wyatt et al.

"Balanced Dual-Detector Receiver for Optical Heterodyne Communication at Gbit/s Rates", *Electronics Letters*, vol. 22, No. 8, Apr. 10, 1986, pp. 413-415, B. L. Kasper et al.

"All Fiber 90° Optical Hybrid for Coherent Communications", *Optical Fiber Communication Conference and Sixth International Conference*, Reno, Nev., Jan. 19-22, Tech. Digest, pp. 59-60, L. G. Kazovsky et al., 1987.

(List continued on next page.)

*Primary Examiner*—Donnie L. Crosland
*Assistant Examiner*—L. Van Beek
*Attorney, Agent, or Firm*—Samuel H. Dworetsky

[57] ABSTRACT

An optical communication system in which a group, or "comb", of intelligence-bearing signals are frequency-division-multiplexed and stabilized using a corresponding "comb" of resonances associated with a Fabry-Perot cavity.

6 Claims, 16 Drawing Sheets

OTHER PUBLICATIONS

"An Optical Heterodyne Mixer Providing Image-Frequency Rejection", *Journal of Lightwave Technology*, vol. LT-4, No. 11, Nov. 1986, pp. 1722-1725, Bernard Glance.

"Crosstalk and Prefiltering in a Two-Channel ASK Heterodyne Detection System Without the Effect of Laser Phase Noise", *Optical Fiber Communication Conference and Sixth International Conference*, Reno, Nev., Jan. 19-22, 1987, Post Deadline Paper PDT-13, pp. 52-57, Y. K. Park et al.

"Ultrahigh Finesse Fiber Fabry-Perot Interferometers", *Journal of Lightwave Technology*, vol. LT-4, No. 4, Apr. 1986, pp. 382-385, J. Stone et al.

"Optical-Fibre Fabry-Perot Interferometer with Finesse of 300", *Electronics Letters*, vol. 21, No. 11, May 23, 1985, pp. 504-505, J. Stone.

"Frequency Control of Local Oscillators", *Radiation Laboratory*, Series 16, McGraw-Hill, N.Y., 1948, pp. 342-347, R. V. Pound, 6-1987.

45 Mb/s
P = -40 dBm

FIG. 9
45 Mb/s
P = -61.6 dm
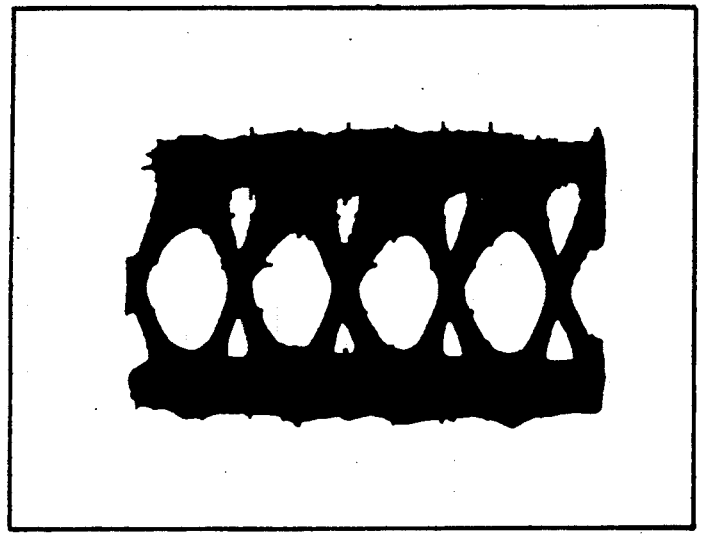
ONE CHANNEL
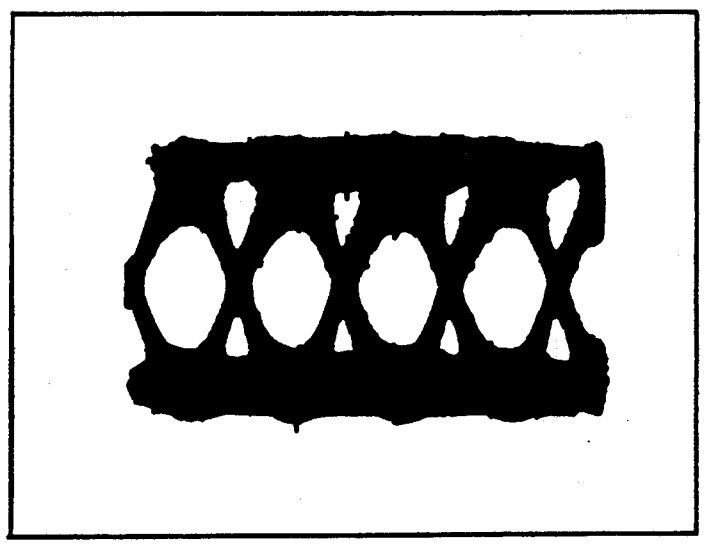
TWO CHANNELS SPACED AT 100 MHz

OPTICAL COMMUNICATION SYSTEM WITH A STABILIZED "COMB" OF FREQUENCIES

This application is a continuation of application Ser. No. 346,255, filed on May 1, 1989, now abandoned, which is a continuation of application Ser. No. 059,973, filed on June 9, 1987, now abandoned.

FIELD OF THE INVENTION

This invention involves optical communications systems in which a group, or "comb", of intelligence-bearing-signals are frequency-division-multiplexed, and stabilized using an analogous "comb" of resonances associated with Fabry-Perot cavities.

BACKGROUND OF THE INVENTION

The use of optical frequencies to transmit intelligence-bearing-signals results in greatly increased information carrying capacity or bandwidth, and therefore greatly reduced transmission costs. This economic benefit has driven the development of optical communications over the past fifteen years. Various engineering advances continue to help realize the full bandwidth potential of optical communications systems.

One mode of optical communications which helps realize the bandwidth potential of such systems involves the frequency multiplexing of intelligence-bearing-signals in order to increase the realized bandwidth of the system. This frequency multiplexing is in many ways analogous to the frequency multiplexing which is well known in the field of radio transmission. In such multiplexing, known alternatively as frequency division multiplexing (FDM), or wavelength-division-multiplexing (WDM), different intelligence-bearing-signals are transmitted at different frequencies, thereby enhancing the information carrying capacity of the transmission system. See, for example, E. J. Backus et al, *Electronics Letters*, Vol. 22, No. 19, Sept. 11, 1986, where, in addition, heterodyne techniques are used to receive the signals. However, in such a frequency-division-multiplexed system, the values of the various frequencies, which carry the different information-bearing signals, must not drift, if they are to remain separated from each other and not interfere. In radio transmission, this is most economically accomplished by using a highly stable frequency generator, usually frequency stabilized by a quartz crystal resonator. However, in the optical domain, such stable frequency generators are prohibitively expensive. Consequently, other avenues must be sought to maintain the frequency spacing between the various intelligence-bearing-signals which are multiplexed in an optical communication system.

Techniques have been suggested in the prior art for frequency stabilizing single optical frequencies. From the perspective of the invention described in this patent, one of the most interesting of these techniques involves transmission through a Fabry-Perot resonator, or cavity, referred to here as a "Fabry-Perot". In such a system, a resonance line of the Fabry-Perot is used, in conjunction with a feedback circuit, to stabilize the frequency source, usually a laser. Exemplary of such stabilization techniques is the article by K. W. Cobb et al, *Electronics Letters*, Vol. 18, No. 8, page 336-337, Apr. 15, 1982, and Tot Okoshi et al, *Electronics Letters*, Vol. 16, No. 5, pages 179-181, Feb. 1980. A similar technique utilizing light reflected by a Fabry-Perot is reported by Sollberger et al in *The Journal of Lightwave Technology*, Vol. LT-5, No. 4, pages 485-491, Apr. 1987. However, the stabilization of a single frequency does not alleviate the problem of signal interference because signal interference still results due to the drift of the other, non-stabilized, frequencies. Additionally, even if all of the frequencies are stabilized by their own individual Fabry-Perots, the problem of signal interference still remains because of the drift associated with the Fabry-Perots themselves.

A technique for stabilizing a number of different optical frequencies has been suggested by D. J. Hunkin et al in *Electronics Letters*, Vol. 22, No. 7, pages 388-389, Mar. 27, 1986. In this technique, referred to as the "injection locking technique", a group of equally spaced frequencies is generated by frequency modulating a laser with an appropriate tone. The resultant equally spaced sidebands are used to stabilize a number of different optical frequencies. However, there is no simple feedback mechanism to effectively prevent the optical frequencies, which are to be stabilized, from "unlocking".

SUMMARY OF THE INVENTION

This invention is a technique for frequency stabilizing a series of "equally" spaced, intelligence-bearing, "optical" frequencies using the resonant characteristics of a Fabry-Perot cavity. The technique, in its broadest embodiment, involves the realization that there exists a group, or "comb", of "equi-spaced" resonances characteristic of Fabry-Perot cavities, which can be associated with an analogous comb of "equi-spaced" intelligence-bearing signal-frequencies. The recognition of this analogy, between the equi-spaced resonances of Fabry-Perot cavities and the equi-spaced intelligence-bearing signal-frequencies, permits one to use Fabry-Perot cavities to stabilize the comb of intelligence-bearing signal-frequencies. The stabilization is effected through the use of appropriate feedback loops.

In an embodiment of the broad concept of this invention, separate error signals are generated proportional to the drifts of each of at least two multiplexed optical signals. These signals will have been modulated at different frequencies, referred to as "dither" frequencies. The error signals associated with the drifts of each of the at least two multiplexed signals are generated by independently "mixing" the dithered component of the multiplexed signals with the corresponding dithering frequencies. As a result of these latter "mixing" steps, appropriate independent error signals are generated. These error signals are then fed back to the appropriate devices to correct the drift of the signal sources. The term "mixing" is used here consistent with its common usage in radio transmission and generally refers to processing of two signals to yield the mathematical product of the two signals.

The invention may be effected in at least two different embodiments. In the first embodiment, each source of optical frequencies is "locked" to its own dedicated Fabry-Perot cavity. The various Fabry-Perot cavities associated with each optical frequency are then locked relative to one another, at least to the extent that they are prevented from drifting relative to one another. In this way, the individual frequencies, which comprise the comb of intelligence-bearing signals, are stabilized, which prevents them from drifting and interfering with each other. This particular embodiment is especially useful where the various optical sources, which generate the intelligence-bearing frequencies, are separated physically from each other.

In a second embodiment of the invention, the comb of intelligence-bearing frequencies is stabilized by locking each of the individual frequencies which comprise the comb to specific resonances of a single Fabry-Perot cavity. This particular embodiment is especially useful where all of the sources which generate the information-bearing frequencies are located in close physical proximity. In both of these embodiments, the various Fabry-Perot cavities need not be exactly identical, especially with regard to the spacing between the various resonant frequencies of the Fabry-Perot cavities. The invention is described here in terms of transmission through a Fabry-Perot, but may also be realized by means of reflection off a Fabry-Perot.

BRIEF DESCRIPTION OF THE DRAWING

The invention will be described in detail in terms of specific representations shown in the attached figures. The figures are described in brief as follows:

FIGS. 8 and 9 are representations of eye patterns for signals received using the circuit of FIG. 3;

DETAILED DESCRIPTION OF THE DRAWING

I. General Description of the Invention

The invention, in its broadest embodiment, involves the stabilization of a comb of intelligence-bearing frequency-multiplexed signal-frequencies using the resonances of a Fabry-Perot cavity. The multiplexed signal will have been modulated at a frequency which may be representative of intelligence, and which is referred to here as a "dithering" frequency. The stabilization is effected through the use of at least two appropriate feedback loops. Separate error signals, associated with the drifts of at least two signals which have been multiplexed, and transmitted through the Fabry-Perot, are independently generated by mixing the dithering component of the multiplexed signals with the corresponding "dithering" frequencies.

The multiplexed signals are intelligence-bearing signals, including signals which are inserted, for example, for references purposes only, and carry no further intelligence. The term "dithering" refers to the modulation of any appropriate frequency. The dithering is effected in order to superimpose an intelligence-bearing signal on the frequency in question, either as in classical modulation, or for correlation purposes, associated with subsequent generation of an error signal. In certain embodiments the dithering may be effected to simultaneously superimpose a classical intelligence-bearing signal on the frequency in question, and for subsequent correlation purposes.

Figure 1:
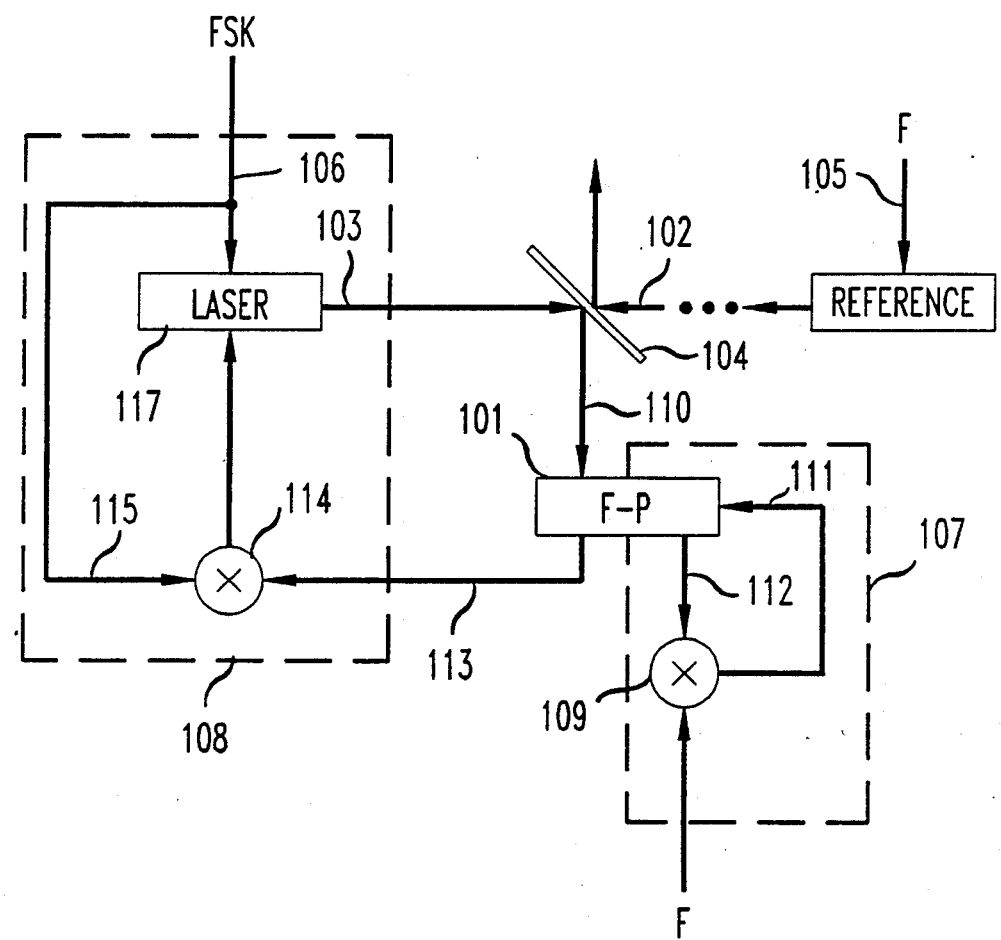
FIG. 1 is an abbreviated schematic representation of the embodiment of the invention which involves the "locking" of each source to its own dedicated Fabry-Perot cavity.
Figure 2:
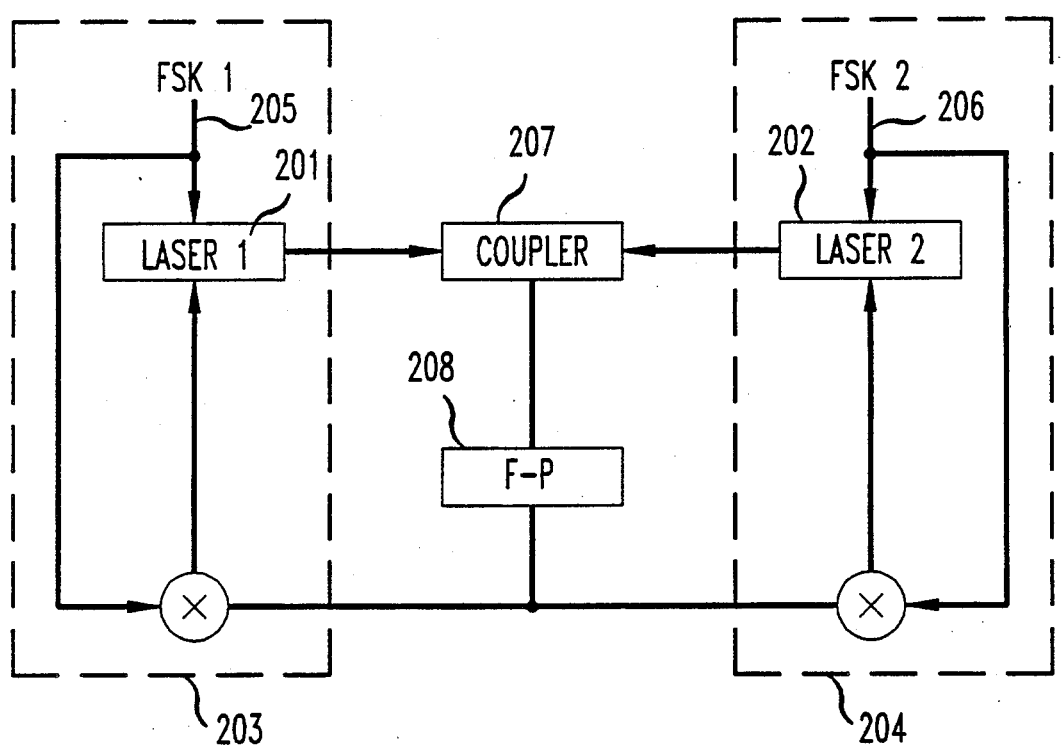
FIG. 2 is an abbreviated schematic representation of the embodiment of the invention which involves the stabilization of a comb of frequencies to the resonances of a single Fabry-Perot cavity.

Two specific embodiments of the broad invention are shown in general schematic form in FIGS. 1 and 2. These figures are discussed in general here, and more specifically immediately below. In FIG. 1, each source of optical frequency, of which 117 is an example, is locked to its own dedicated Fabry-Perot. The various Fabry-Perot cavities associated with each optical frequency are then locked relative to one another, at least to the extent that they are prevented from drifting relative to one another. In a particular embodiment, this locking is effected by the use of a reference signal. However, other techniques such as temperature control may also be used. In such an embodiment, a reference signal may be used merely to check the alignment of the optical resonances of the "locked" Fabry-Perots but not to actively lock the cavities. In the embodiment of FIG. 1, the Fabry-Perots will generally be tunable in order to adjust their relative alignment. The alignment need only be sufficiently accurate to ensure that given number of resonances may be associated with an equivalent number of intelligence-bearing signals. However, other resonances, may not uniquely be associated with intelligence-bearing signals.

In a second embodiment of the invention shown in FIG. 2, the entire comb of intelligence-bearing signals, of which the signal produced by 201 is one, are stabilized by locking the comb to the resonances of a single Fabry-Perot cavity. In this embodiment, the Fabry-Perot need not be tunable.

In FIG. 1, each source of optical frequencies is locked to its own dedicated Fabry-Perot. In this figure, the Fabry-Perot is identified as 101. One source of optical frequency is 117. Only one such source is shown, although any number may be used, each with its own feedback loop 108. A reference signal 102 is combined, or multiplexed, with an intelligence-bearing signal 103 by means of an appropriate coupler 104 so that both signals are transmitted to the Fabry-Perot. The coupler may be selected to transmit only a portion of the reference and information-bearing signals to the Fabry-Perot, so that another portion of the signals may be transmitted, for example, to a user. The reference frequency is modulated with a "dithering" frequency, F (105), which, in this embodiment, carries no other intelligence, while intelligence-bearing frequency 103 is modulated, or dithered, in accordance with appropriate intelligence using, for example, a frequency shift keying (FSK) technique, 106.

The multiplexed signals, after leaving the Fabry-Perot at 112 and 113, are fed to two separate feedback loops 107 and 108 so as to stabilize the Fabry-Perot and the laser, respectively. In the Fabry-Perot feedback loop, the dithered component of the multiplexed signals 112, in the form of transmitted resonances of the Fabry-Perot which may be detected by a photodetector, 169 are fed to one input of a mixer 109. The dithering frequency 105 is fed to another input of the mixer. The mixer correlates the two inputs, thereby generating an error signal which is proportional to the drift of a selected resonance of the Fabry-Perot. This error signal, 111, is then fed back to the Fabry-Perot tuner 118, in order to appropriately adjust it, thereby frequency locking the resonance to the reference signal.

In the second feedback loop, 108, the laser frequency is stabilized. In this feedback loop, the dithered component of the multiplexed signals, which may be detected by a photodetector, 169, after leaving the Fabry-Perot, are fed to one input of a mixer 114. The FSK frequency is fed to the other input of the mixer, 115. The mixer correlates the two inputs, thereby generating an error signal which is proportional to the drift of the laser relative to a selected resonance of the Fabry-Perot. The resultant error signal is then fed back to the laser at 116 in order to appropriately adjust it, thereby frequency locking the laser to the selected resonance of the Fabry-Perot.

While this particular embodiment shows the reference frequency being dithered at 105 before it is transmitted, more general embodiments may involve reference frequencies which are transmitted undithered and which are only dithered locally for the purposes of signal processing in conjunction with the production of an error signal.

FIG. 2 is an embodiment of the invention in which the entire comb of intelligence-bearing frequencies are stabilized by locking the comb to difference resonances of a single Fabry-Perot cavity. In this figure, only two sources, 201 and 202, are shown, each with its own feedback loop, 203 and 204, respectively. The comb therefore contains only two frequencies. However, any number, N, of optical sources may be used, each with its own feedback loop. In such a case the comb will contain N frequencies. In a particular embodiment, the information is generated by means of frequency-shift-keyed signals FSK1 and FSK2, 205 and 206, respectively. This comb of two frequencies is then multiplexed in a coupler 207 and transmitted through a Fabry-Perot 208. Each laser frequency is associated with a particular resonance of the Fabry-Perot. The output of the Fabry-Perot is fed into the two feedback loops 203 and 204. In each feedback loop, the dithered component of the Fabry-Perot output, which may be detected by a photodetector, 209, is mixed with the appropriate FSK signal. The mixer acts as a correlator to generate an error signal which corresponds uniquely to the frequency drift of the appropriate laser relative to the associated Fabry-Perot resonance. In this embodiment, as in the first embodiment, the frequency difference between the output of any two of the lasers must be a multiple of the frequency difference between the resonances of the Fabry-Perot cavity so that the laser frequencies will correspond to transmission resonances of the Fabry-Perot.

Throughout the description of this invention the term "optical" as used, for example, in "optical frequencies", or "optical communication systems", refers to a range of frequencies in the electromagnetic spectrum which may be transmitted efficiently through fibers, generally referred to as "optical fibers", and generally comprising dielectric materials. "Optical" frequencies will usually occur in the wavelength range of 0.3 to 2 or 3 microns. However, new materials may permit transmission of higher or lower frequencies through such fibers, and in such event such frequencies would also be included in the term "optical" as used here. The terms "equi", "equal", or "equally", as used here in connection with the spacing of the Fabry-Perot resonances, or the spacing of the various intelligence-bearing signal-frequencies, is broader then exact equality. The term includes spacings which may be significantly unequal, but still permit practice of this invention. The term "Fabry-Perot" cavity or resonator refers to a device which transmits selected, approximately equally spaced, narrow bands of optical frequencies. The device usually comprises a region, generally longitudinal or cylindrical, bounded by partially reflecting surfaces. The term "Fabry-Perot", and the device it represents, are well known to those skilled in optics.

II. Detailed Description of the Invention

A. The FDM Coherent Optical Star Methodology

The invention involves the detection of frequency-division-multiplexed (FDM) signals. Various general methodologies exist for the transmission and processing of such signals. The invention, while not limited to any one such methodology, is most easily explained in terms of an exemplary methodology. For convenience, we discuss the invention in terms of the "coherent" (i.e., heterodyne detection) "optical star" technique. See, for example, E. J. Bachus et al, *Electronics Letters*, Sept. 1986, Vol. 22, No. 19, pp. 1002–1003, A. R. Chraplyvy et al, *Electronics Letters*, September 1986, Vol. 22. No. 20, pp. 1084–1085, and R. A. Linke, *OFC Sixth International Conference*, Reno, 19–22, Jan. 1987, Technical Digest, pp. 184–185.

While FDM allows use of the wide bandwidth available in optical communications systems, coherent (heterodyne) detection yields high-receiver sensitivity and high-frequency selectivity, and the star configuration yields efficient distribution of optical power through the network. By combining these three features, an optical network is obtained which can provide a large throughput (i.e., number of users × bit rate).

1. Description of a Specific Circuit Configuration

Figure 3:
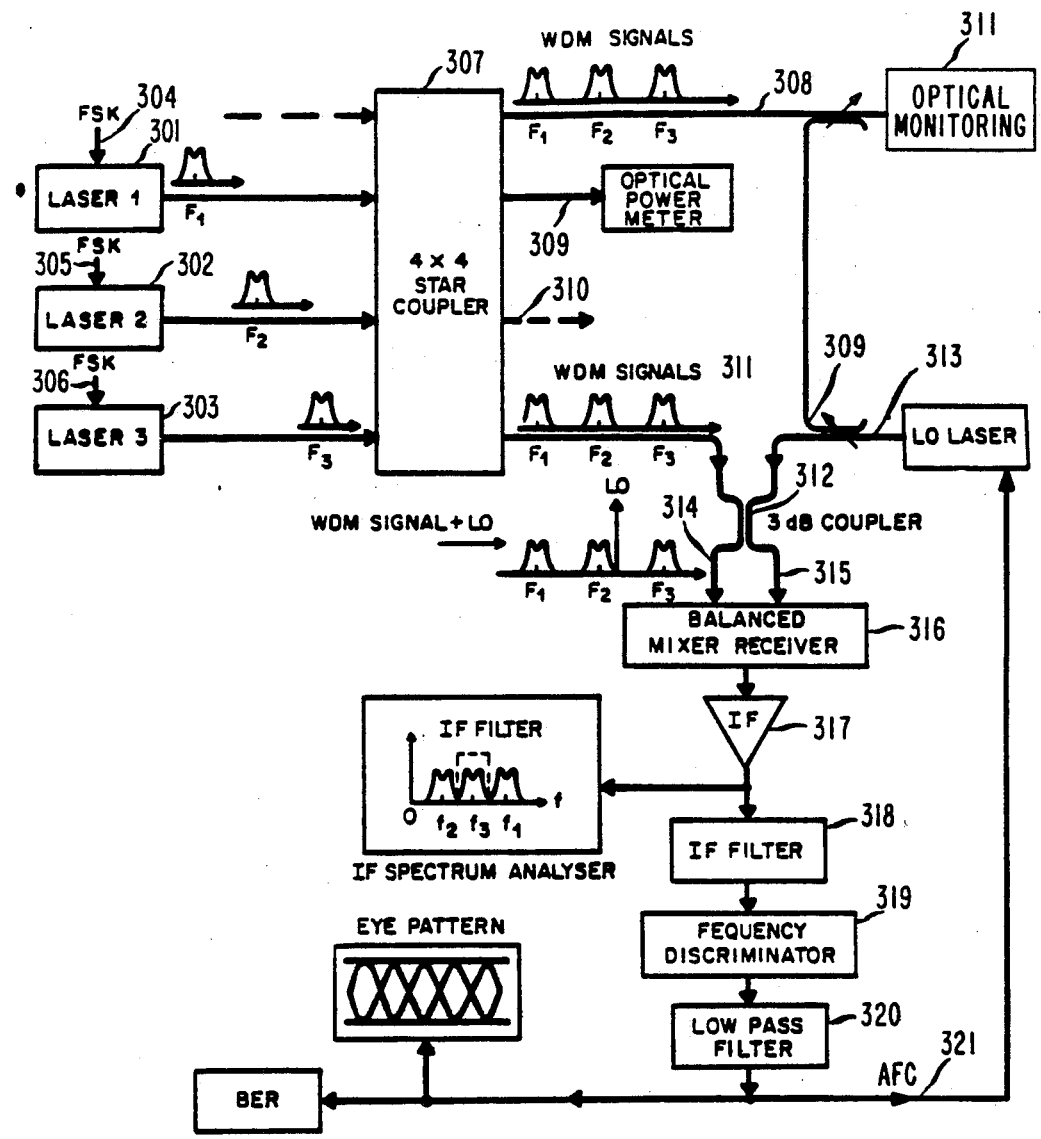
FIG. 3 is a schematic representation of a frequency division multiplexed circuit utilizing heterodyne detection.

FIG. 3 is a schematic representation of a specific circuit configuration which makes use of the FDM coherent optical star methodology. The optical sources used for transmission, 301, 302, and 303, are fast, frequency-tunable, external cavity lasers. See, for example, B. Glance et al *Electronics Letters*, Jan. 1987, Vol. 23, No. 3, pp. 98–99. These lasers provide a narrow-line, single-frequency signal at 1.28 $\mu$m, which can be frequency-tuned over about 4000 GHz as well as frequency-modulated up to 100 MHz. Modulation of the sources at 304, 305, and 306, is done by FSK at 45 Mb/s, with a modulation index of about one, by a random NRZ bit stream with $2^{15}-1$ pattern length. The three sources transmit at optical frequencies spaced by a frequency interval of 300 MHz.

The three optical signals are combined by a 4×4 fiber star coupler, 307. Each of 4 output fibers of the coupler, 308, 309, 310, and 311, carries the three FDM signals. The signal from one of these fibers is combined by means of a 3 dB fiber coupler, 312, with the LO signal, 313, provided by a conventional external-cavity laser. See, for example, R. Wyatt et al, *Electronics Letters*, Feb. 1983, Vol. 19, No. 3, pp. 110–112. The polarization of the transmitted signals is manually adjusted to match the polarization state of the LO signal. The combined signals from the two outputs of the coupler, 314 and 315, feed a balanced-mixer receiver, 316, see, for example, B. L. Kasper et al, *Electronics Letters*, Apr. 1986, Vol. 22, No. 8, pp. 413–415, which heterodynes the received signal to an IF frequency of 225 MHz. The optical power of the LO signal at the photodetectors, is about 0.7 dBm. As a result, the shot noise due to the LO signal dominates the thermal noise of the receiver. The use of a balanced-mixer is important in a FDM star network to eliminate the interference arising from the direct detection terms. It also allows a more efficient use of the optical power of the LO source, and thus reduces the degradation caused by the shot noise originating from the received signal. (In a FDM star network, the shot noise caused by the received FDM signal is equal to the shot noise due to one transmitting optical source minus the excess loss of the network).

The IF signal is amplified at 317 and then filtered by an IF filter 318 which is 60 MHz wide and centered at 225 MHz. Demodulation is accomplished by a frequency discriminator, and the resulting baseband signal is filtered by a low-pass filter having a 3 dB cut-off of 35 MHz. Selection of the desired channel is achieved by tuning the LO frequency to the value that centers the wanted channel within the bandwidth of the IF filter. The resulting IF is maintained by an Automatic Frequency Control (AFC) circuit, 321, controlling the optical frequency of the LO signal.

The signal from one, 308, of the three remaining output fibers from the star coupler, is used after combining with a fraction of the LO signal at 309 and 310, to monitor the four optical signals, the three FDM signals, and the LO signal at 311. This is done using a spectrometer and a scanning Fabry-Perot etalon. Another output fiber is utilized to measure the received signal. The measurement takes into account the slight difference of received signal between this fiber and the fiber connected to the receiver.

Figure 4:
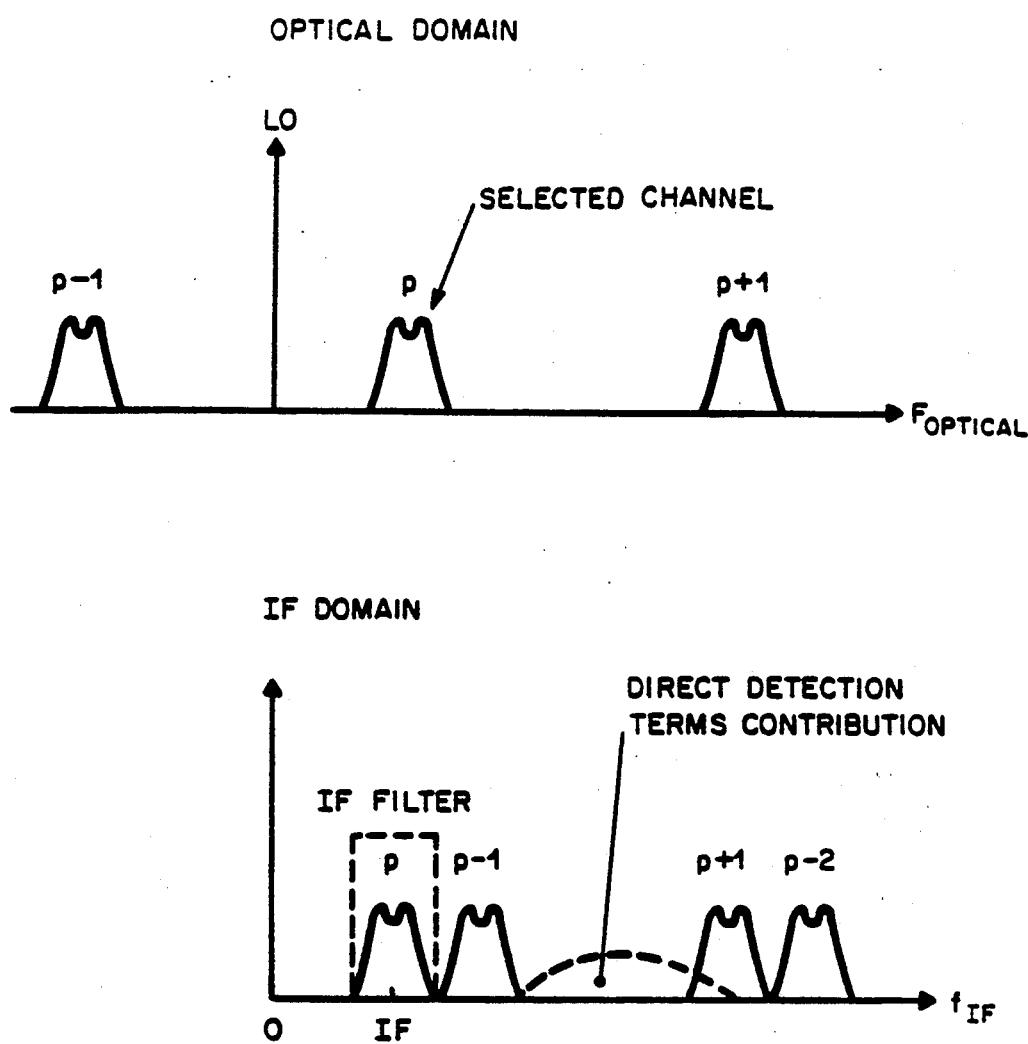
FIG. 4 is a frequency representation of the heterodyne process.
Figure 5:
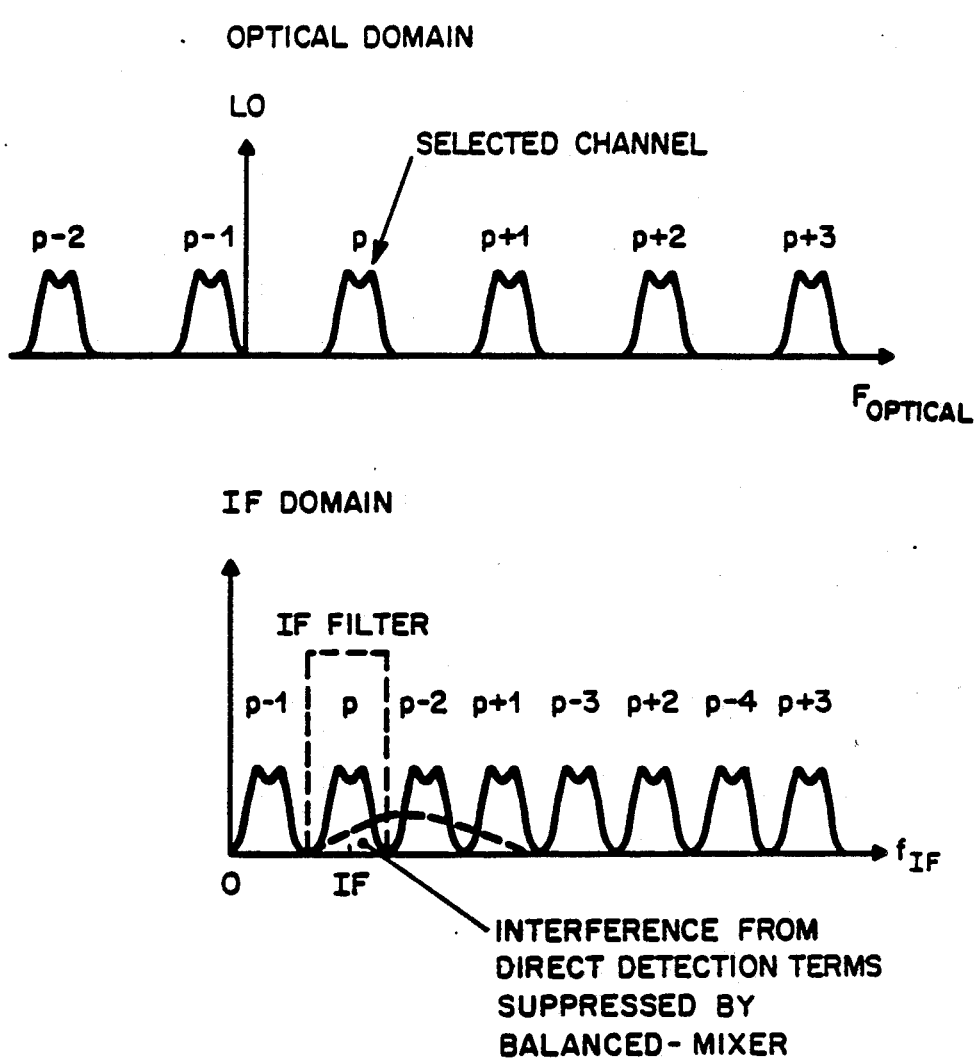
FIG. 5 is a further frequency representation of the heterodyne process.

For a given bit rate, the system throughput depends on the number of channels which can be multiplexed in the available optical bandwidth. However, this bandwidth is much larger than any feasible IF and therefore the LO frequency must be positioned near the desired channel, See, for example, L. G. Kazovsky, *OFC Sixth International Conference, Reno*, 19–22, Jan. 1987, Technical Digest, pp. 59–60. In addition, an optical mixer is equally sensitive to inputs above and below the LO frequency. As a result the channel spacing must be large enough to avoid interference from the image frequency. Such a heterodyne process interleaves in the IF domain the channels on the low-frequency side of the LO signal with the channels on the high-frequency side of this signal. The situation is improved through the use of an image rejection mixer see, for example, B. Glance, *Journal of Lightwave Technology*, Nov. 1986, Vol. LT-4, No. 11, pp. 1722–1725, but this requires a more complicated receiver. Consequently, the channels are spaced closer in the IF domain (see FIG. 4). The minimum achievable channel spacing varies proportionately with the value of the IF frequency when the lowest IF channel is selected by the IF filter. As a result, a large channel spacing is needed since the IF frequency must be well above the baseband to avoid interference between the IF selected signal and the resulting demodulated signal. These two problems can be resolved conjointly by selecting the second lowest IF channel (see FIG. 5). The result is obtained by tuning the LO frequency at the edge of the optical channel adjacent to the selected channel. But in this case, the selected IF channel is interfered by the direct detection terms arising from the frequency beat between adjacent optical channels (for FSK modulation, interference from direct detection terms arises mainly from frequency beat between adjacent optical channels). This interference can be significant in a star network, where the optical power of the received FDM signals can be comparable to that of the LO signal. However, this interference can be suppressed (the amount of suppression depends on the degree of balancing) by using a balanced-mixer receiver. See, for example, L. G. Kazovsky, *OFC Sixth International Conference Reno*, 19–22, Jan. 1987, Technical Digest, pp. 59–60. The minimum channel spacing, and thus the system throughput, is then determined by the channel spacing preventing co-channel interference in the IF domain. See, for example, Y. K. Park et al, *OFC Sixth-International Conference, Reno*, 19–22 Jan. 1987, Post Deadline Paper PDT-13, pp. 52–57.

a. IF Channel Selection

In order to operate at an IF frequency above the frequency of the baseband signal, the desired optical channel is heterodyned by an LO signal which is tuned to the edge of an adjacent optical channel. Thus, the channel selected by the IF filter is the second lowest IF channel. This arrangement minimizes the frequency spacing needed between optical channels and separates the demodulated baseband signal from its IF signal. For a modulation rate of 45 Mb/s, the minimum optical frequency spacing preventing co-channel interference in the IF domain is about 260 MHz. To provide a protective margin, we selected a channel spacing of 300 MHz. The resulting frequency spacing between the interleaved IF channels is 150 MHz.

Figure 6:
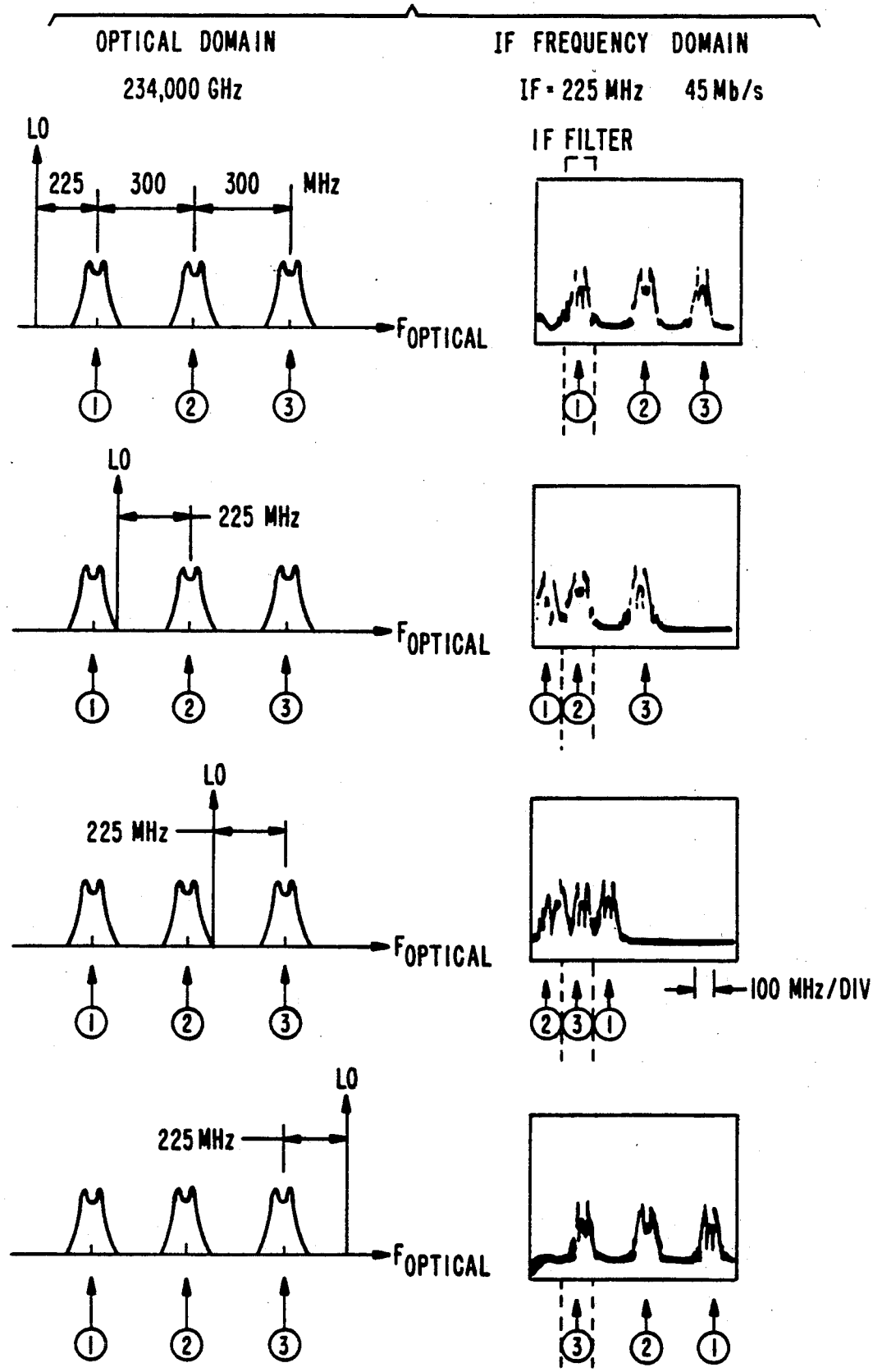
FIG. 6 is a representation of signals which are detected in the heterodyne receiver shown in FIG. 3.

These results are illustrated in FIG. 6, which shows the IF power spectra of the three channels, heterodyned from an optical frequency of about 234,000 GHz, and selected successively by the IF filter centered at 225 MHz. The three first cases show the selection, respectively, of channel #1, channel #2 and channel #3. In this case, channel #3 is interleaved between two adjacent channels spaced at 150 MHz as would occur in a system having a large number of channels. The fourth case shows the selection of channel #3 for a LO frequency tuning yielding the reversed IF channel distribution as compared to the distribution given by the selection of channel #1. Opposite to each IF channel spectrum distribution is illustrated the corresponding power spectra of the optical signals and the frequency position of the LO signal yielding the resulting IF spectra. With more than 3 channels, there would be no further channel interference since only the two channels adjacent to the selected IF channel give rise to co-channel interference.

b. Receiver Sensitivity Measurement

Figure 7:
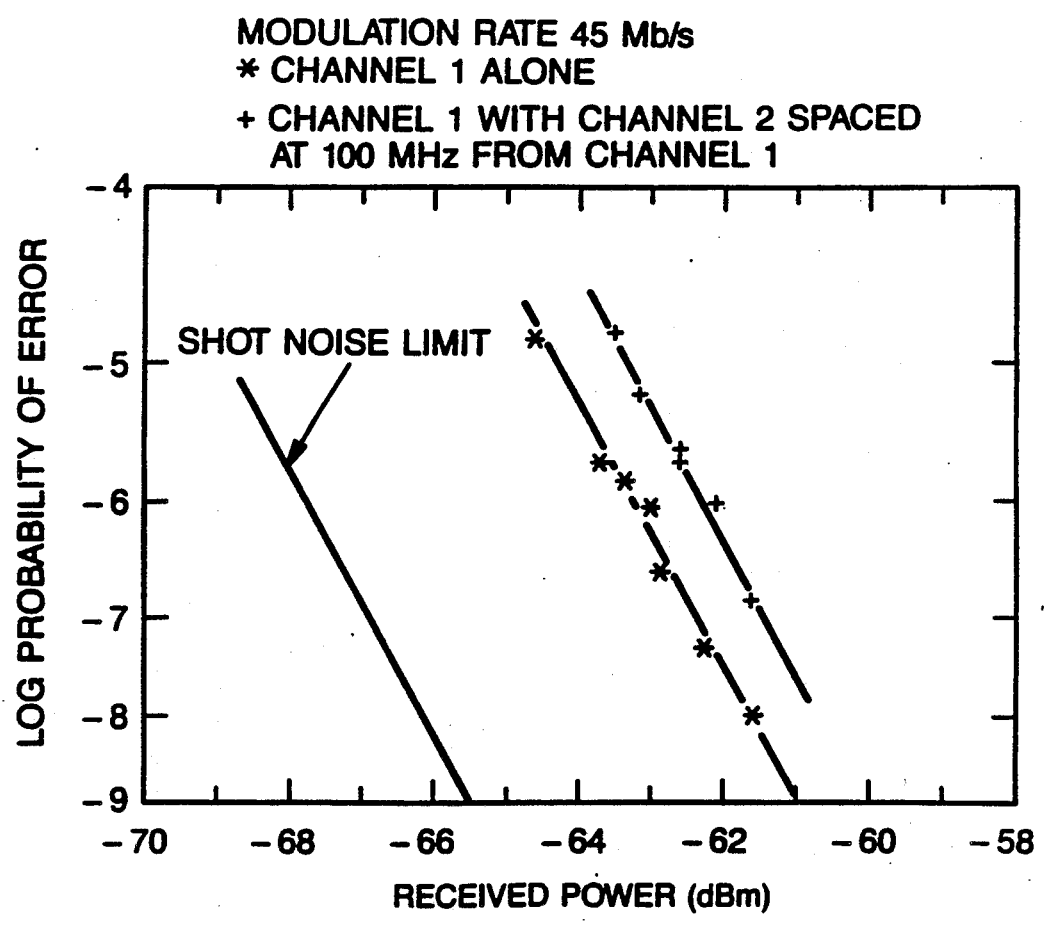
FIG. 7 is a graphical representation of the received power versus the bit error rate for the heterodyne receiver shown in FIG. 3.
Figure 8:
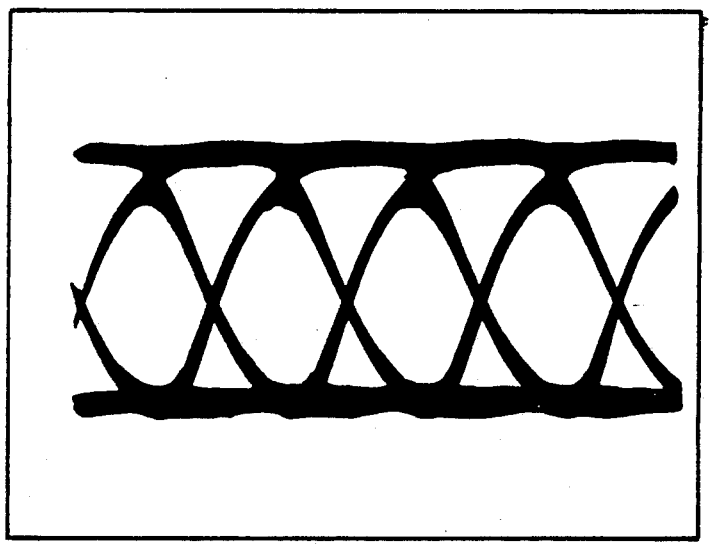

For one channel, the minimum received optical power needed to obtain a BER of $10^{-8}$ is $-61.6$ dBm (FIG. 7). Extrapolating this result to a BER of $10^{-9}$ yields a received optical power of $-61$ dBm. This result corresponds to the actual optical power received at the output of the 4×4 optical star coupler. It does not include the additional excess loss due to the 3 dB coupler and the fiber connectors, which amounts to about 0.2 dB. Expressed in terms of the averaged number of photons/bit, the receiver sensitivity is 113 photons/bits, which is 4.5 dB from the shot noise limit of an ideal FSK optical receiver. The 4.5 dB degradation includes a 1 dB penalty due to the mixmatch of the laser modulation port, which was designed for dc bias only. The mismatch causes a 20 percent closure of the eye pattern in absence of system noise (FIG. 8).

c. Co-Channel Interference Measurement

Channel spacing may be deliberately reduced in order to determine co-channel interference. The power penalty caused by co-channel interference is 1 dB when the selected channel is interfered in the IF domain by a second channel spaced by 100 MHz, received with the same optical power and modulated at the same bit rate of 45 Mb/s but with a different random bit stream. This result is shown in FIG. 7, which displays the measured BER versus the received power for one channel alone, and the similar result obtained when the channel is interfered by a second channel spaced by 100 MHz in the IF domain. The eye patterns measured for these two cases are shown in FIG. 9 for a received optical power of $-61.6$ dBm.

Figure 10:
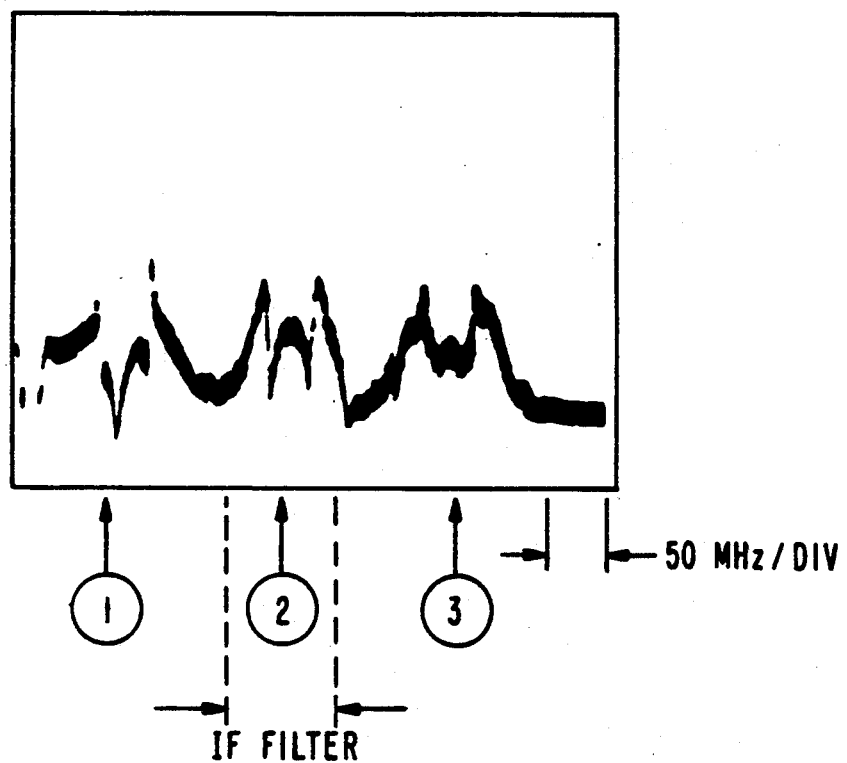
FIG. 10 is the measured IF spectrum for the device of FIG. 3, where the channel spacing is intentionally reduced in order to determine co-channel interference.

The co-channel interference increases very fast when the frequency spacing is rediced to 90 MHz. It completely disappears when the frequency spacing is increased to 130 MHz. Similarly, no co-channel degradation is observed when the selected channel is interleaved by two adjacent channels spaced by 150 MHz. FIG. 10 shows the measured IF spectrum from this case, where each of the three channels is received at a level of $-61.6$ dBm and is modulated at 45 Mb/s.

d. System Throughput

The system throughput can be estimated from the above results for a network operating at the wavelength of 1.55 $\mu$m. For example, let us assume that a user transmits 0 dBm of optical power into his fiber connected to a star coupler interconnecting $2^{17}$ subscribers. The excess loss suffered by a signal propagating through the star coupler is proportional to the 17 stages of 3 dB couplers constituting the star. Since commercially available 3 dB couplers have about 0.1 dB excess loss, such a star coupler will introduce an excess loss of about 2 dB. Adding 4 dB of fiber loss for a network having a 10 km radius yields $-57.2$ dBm of optical power received by each subscriber from the signal transmitted by the above user. This received power is 3.8 dB larger than that measured to obtain a BER of $10^{-9}$ for a modulation rate of 45 Mb/s. Therefore, the above results indicate that 100,000 users transmitting at this bit rate can be interconnected within a radius of 10 km by a FDM coherent star network, provided that the lasers can be turned over the frequency range filled by the FDM channels. A throughput comparable to this value (4500 Gb/s user) may be achieved for a smaller number of users operating at a higher bit rate.

B. Stabilization Using A Fabry Perot for Each Frequency Source

As discussed, an optical network using FDM and heterodyne detection techniques can provide the capability of interconnecting a very large number of subscribers. However, such a system requires that the frequency interval between the optical carriers be controlled in order to avoid collision between the optical signals. In a radio system, this problem is solved by assigning a fixed frequency to each carrier controlled by a highly stable frequency source. Such an approach will be very difficult and expensive to implement in an optical FDM communication system, especially if the frequencies of the optical sources must be spaced at small frequency intervals (hundreds of MHz to several GHz).

A simpler solution to this problem is achievable by maintaining constant the frequency spacing between optical signals and allowing the set of frequencies drift together. Heterodyne reception of a slowly drifting signal is easily accommodated by an Automatic Frequency Control (AFC) circuit in the receiver. This section discusses the stabilization of each frequency through the use of a Fabry-Perot see, for example, J. Stone et al., Vol. 21, No. 11, pp. 504–505, May 23, 1985, and J. Stone et al, *Journal of Lightwave Technology*, Vol. LT-4, No. 4, pp. 382–385, Apr. 1986, with each frequency source or subscriber station. The resonances of the Fabry-Perot define a set of frequencies, the same for all the users, from which each subscriber can select a resonance to lock his optical carrier. The circuit providing this result is, for simplicity, first described with all the subscribers' Fabry-Perots frequency-locked to one reference signal. A more reliable circuit is then discussed which uses two reference signals. Finally, a technique is discussed which allows the subscriber to select an optical frequency without interfering with the network.

1. Description of a Circuit Using One Reference Signal

Figure 11:
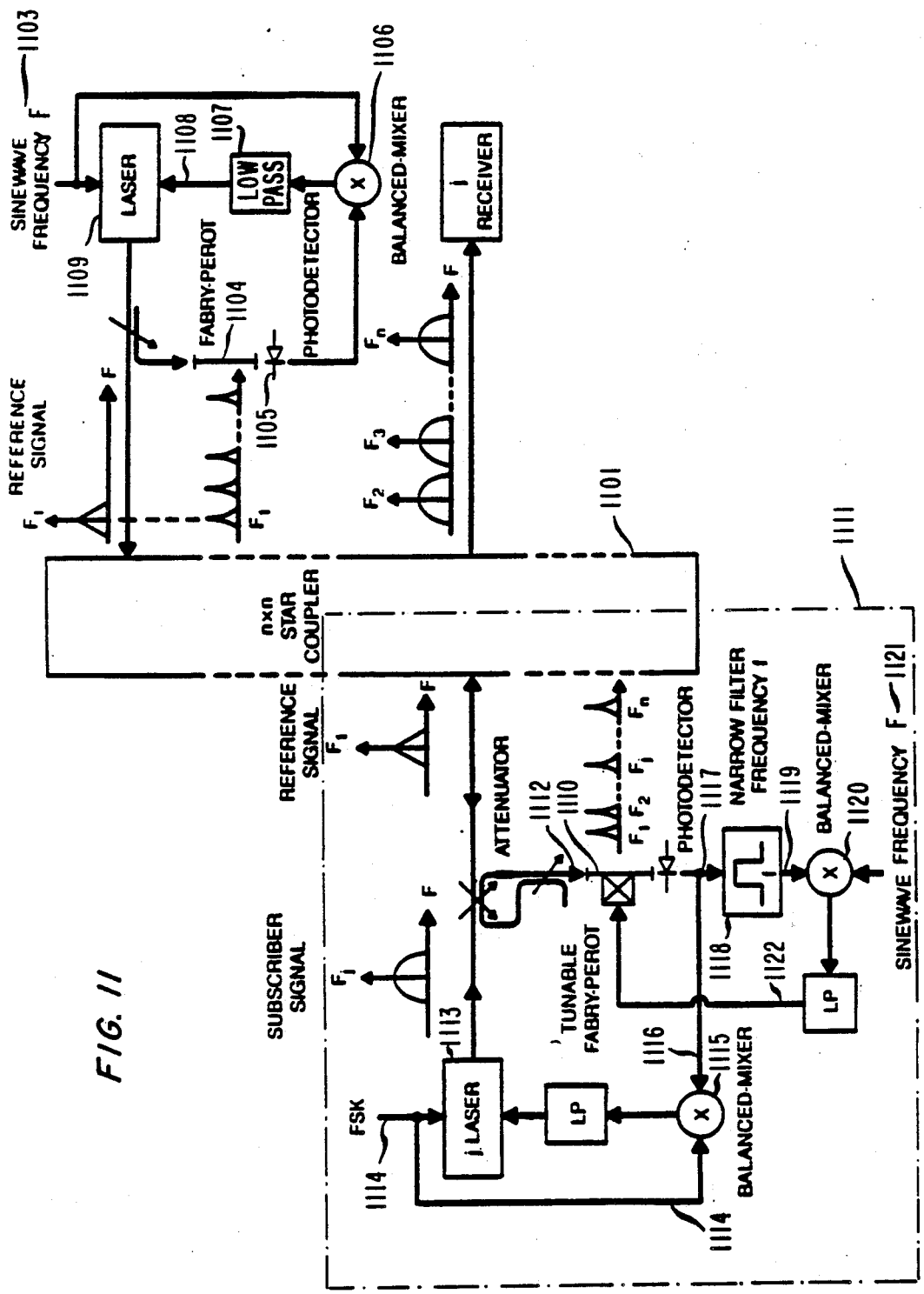
FIG. 11 is a detailed circuit schematic of the embodiment of the invention in which each source of optical frequency is "locked" to its own dedicated Fabry-Perot cavity.

An embodiment of the invention shown in FIG. 11 consists of an optical star coupler 1101 connecting each subscriber by two fibers. One fiber is used for transmission; the other fiber is utilized for signal reception. Each subscriber transmits on a different optical frequency. Its signal is divided equally among all the receiving fibers. Therefore, each subscriber receives a fraction of every transmitted signal including his own. The system assumes the use of single-frequency sources which can be tuned as well as frequency modulated. The modulation is done by Frequency-Shift Keying (FSK).

One optical source 1109 is frequency-modulated by a sinewave (cw) signal, F, 1103. A fraction of the optical signal transmitted by this source is fed into an optical fiber Fabry-Perot 1104. See, for example, J. Stone, *Electronics Letters*, Vol. 21, No. 11, pp. 504–505, May 23, 1985, and J. Stone et al, *Journal of Lightwave Technology*, Vol. LT-4, No. 4, pp. 382–385, Apr. 1986. A photodiode 1105 detects the output signal of the Fabry-Perot. The resulting signal is mixed at 1106 with the cw signal applied to the laser. This provides, after filtering at 1107, an error signal 1108 which locks the frequency of the laser to one of the resonances of the Fabry-Perot 1104, which is then defined, for example, to be the lowest frequency of the set of frequencies used by the system. See, for example, R. V. Pound, *Radiation Laboratory Series* 16 McGraw Hill, New York 1948, pp.

342–347. This reference line is used throughout the network to stabilize a Fabry-Perot 1110 at each subscriber station.

Each of the subscribers have the same frequency-locking circuit 1111 in which the optical signal 1112 feeding the Fabry-Perot includes a fraction of the reference signal 1112. In addition, the frequency dithering of the optical source 1113 is done by the FSK modulating signal 1114. See, for example, R. V. Pound, *Radiation Laboratory Series* 16, McGraw Hill, New York 1948, pp. 342–347.) The subscriber selects a resonance of his Fabry-Perot to frequency-lock its optical source. In this case, the error signal is obtained by mixing at 1115 a fraction of the photodetected signal 1116 with the FSK modulating signal 1114.

The other fraction of the photodetected signal 1117 is filtered by a narrow filter 1118 centered at the frequency of the cw signal defined previously. The filtering process recovers the cw signal originating from the reference signal. This filtered signal 1119 is mixed at 1120 with the same cw signal 1121 supplied (the cw signal can be obtained from a local radio station) to all the subscribers. This yields, after integration, an error signal 1122 (the phase of the local cw signal is adjusted to provide the maximum error signal with the right polarity) which frequency-locks, by means of a piezoelectric device, the Fabry-Perot of the subscriber to the reference signal. See, for example, J Stone et al, *Electronics Letters*, Vol. 21, No. 11, pp. 504–505, May 23, 1985. This process is started by applying a variable voltage to tune the Fabry-Perot in the pull-in range of the reference frequency. One assumes that the Fabry-Perots have the same length within a tolerance such that the set of frequencies used for the network differs, between Fabry-Perots, by a small fraction of a free-spectral range over the total system bandwidth.

2. Description of A Circuit Using Two Reference Signals

Figure 12:
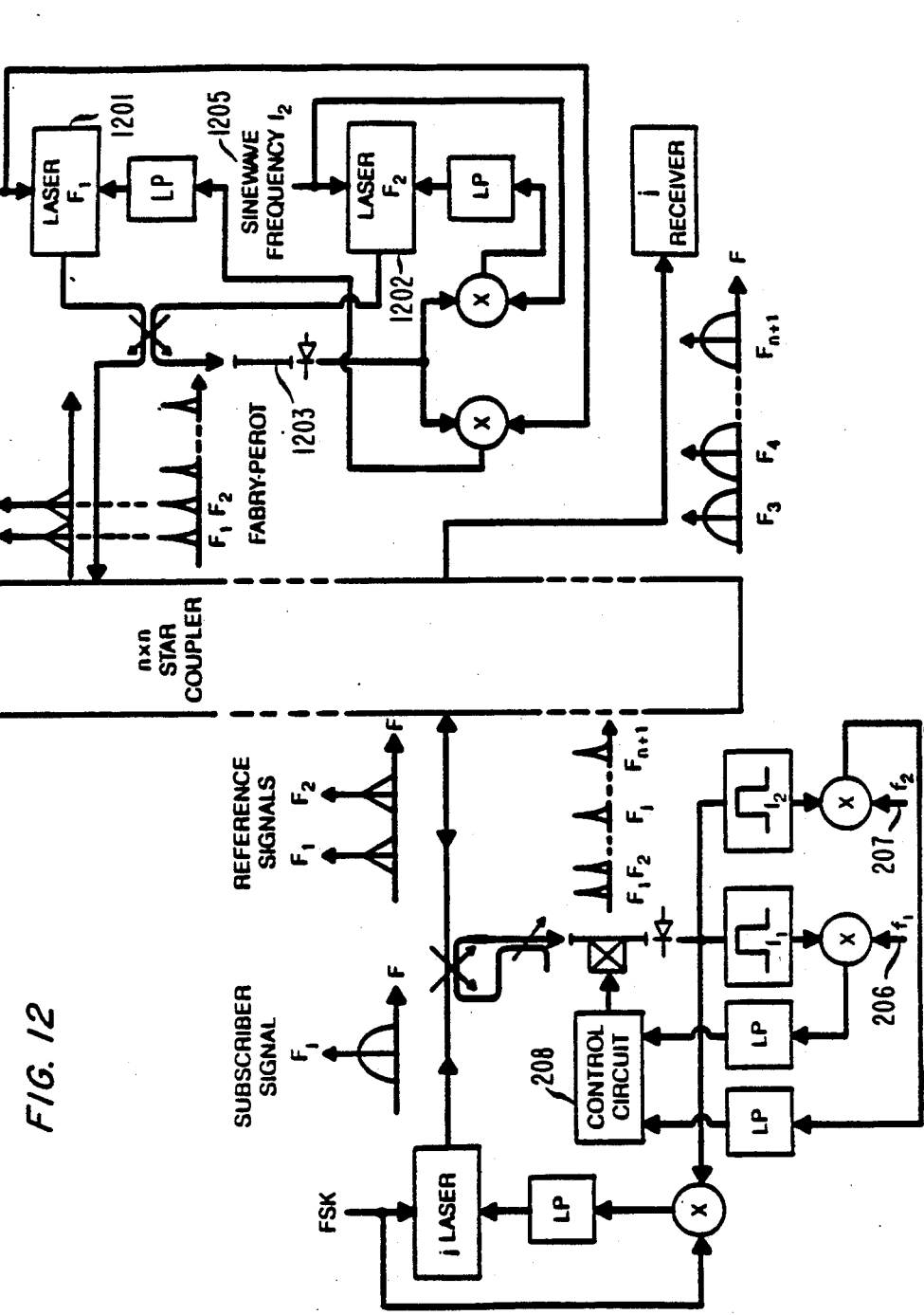
FIG. 12 is a detailed circuit schematic of the embodiment of FIG. 11 further including redundant reference frequency generators.

In the case of a failure of the reference source the FDM network will fail if the system relies on an unique reference signal. This problem can be avoided, as shown in FIG. 12, by using two reference signals 1201 and 1202, each frequency-locked to one of the resonances of a Fabry-Perot 1203 as shown in FIG. 12. The reference signals are frequency-modulated by a sinewave of frequency $f_1$ and $f_2$, 1204 and 1205, respectively. These two sinewaves are provided locally to each subscriber at 1206 and 1207, and thus two error signals, originating from the two reference signals, can be detected independently. A control circuit measures the presence of the two error signals and uses one of them to frequency-lock the subscriber's Fabry-Perot. The absence of one of the error signals is used to indicate a failure of the corresponding reference signal. Action can thus be taken to correct the problem without interruption of the system.

3. Frequency Selection Process

Figure 13:
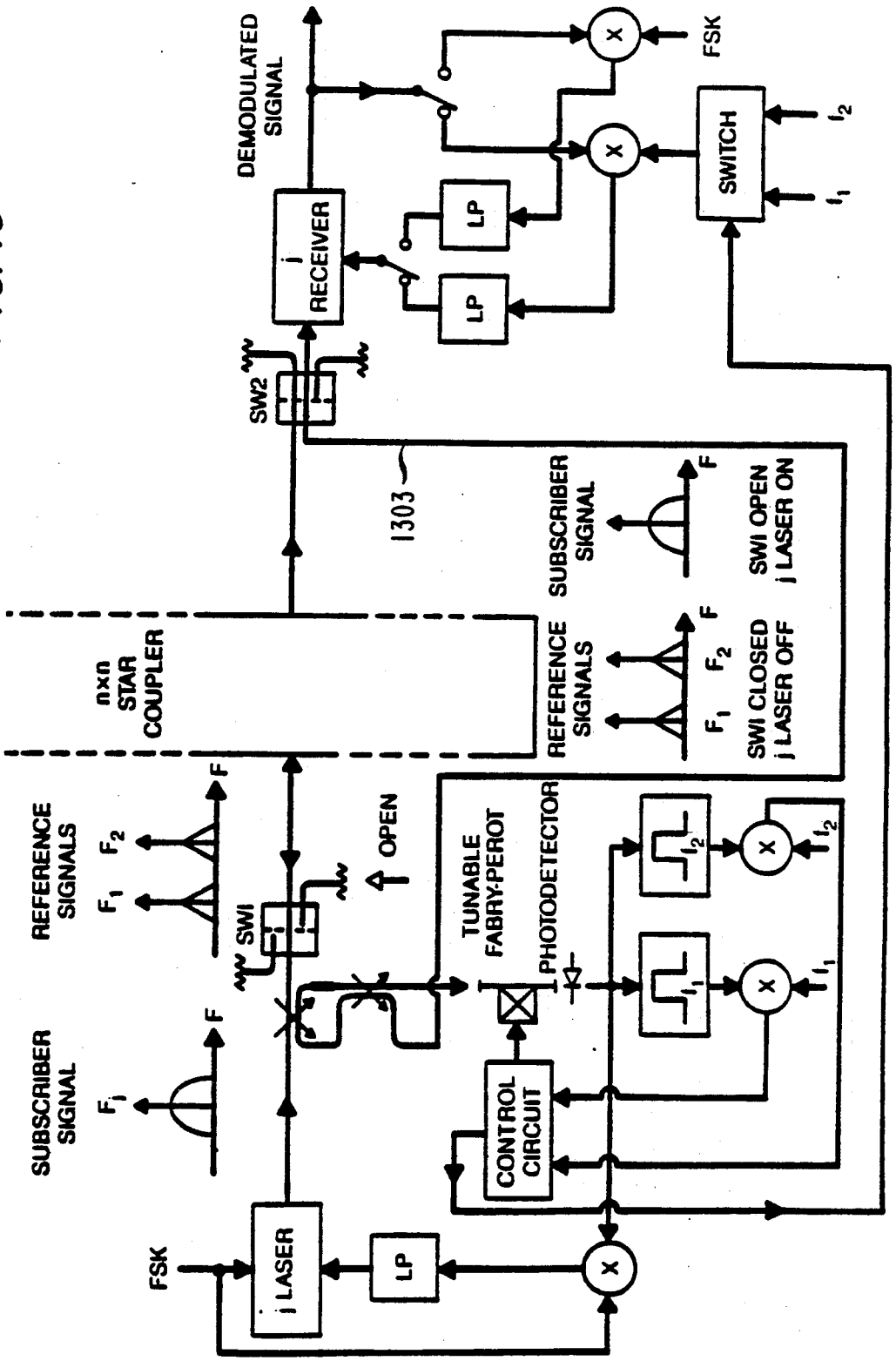
FIG. 13 is a detailed circuit schematic of the embodiment of FIG. 11 including circuitry which permits the user to select a particular optical frequency.

The process which allows a subscriber to select a desired optical frequency must be achieved without interfering with the signal received by the other users. To obtain this result, one may use the circuit of FIG. 13. In using this circuit, the subscriber turns-off his laser 1301 and with 1304 switches his receiver 1302 to a fiber 1303 connected to the frequency-stabilization circuit. Then the receiver, 1302 is turned to detect the cw signal transmitted by the reference source. This process can be done electronically by a circuit 1305 which compares the demodulated signal to the local cw signal. The subscriber then sequentially disconnects his transmitting fiber from the network using 1306, turns on his optical source 1301 and tunes the frequency of his source until the receiver 1302 detects his own FSK modulating signal 1307. This is done by using the electronic process 1305 described above except that the demodulated signal is now compared to the subscriber's modulating signal 1307.

The subscriber's laser 1301 is now turned to the frequency of the reference signal. This reference is the one controlling the system, in case of failure of this source, the frequency selection process uses the other reference signal. Starting from this frequency, the subscriber selects the desired frequency by tuning his optical source through the comb of resonances of his Fabry-Perot, counting the number of zero-crossing given by the error signal of his frequency-locking circuit. The frequency selection process is thus done without interfering with the signal received by the other users. After completion of this process, the subscriber connects back his transmitting fiber to the network using 1306 and his receiving fiber to his receiver using 1304.

C. Stabilization Using a Single Fabry-Perot

The previous scheme uses, at each subscriber location, a tunable fiber Fabry-Perot (see, for example, J. Stone et al, *Electronics Letters*, Vol. 21, No. 11, pp. 504–505, May 1985) resonator providing a comb of equally-spaced resonances from which the subscriber selects one resonance to frequency-lock his optical source. The set of resonances is made the same for all the subscribers by frequency-locking all the Fabry-Perot resonators to an optical signal received from a central location. This section discusses a variant of this scheme in which all the optical sources are frequency-locked to the resonances of a single Fabry-Perot resonator. This frequency stabilization scheme provides a simple solution to the frequency confining problem of FMD optical signals originating from the same location. The optical portion of the implementation may use only a section of fiber acting as a Fabry-Perot resonator, and a photodetector. The remaining signal processing may be done electronically.

1. Circuit Description

Figure 14:
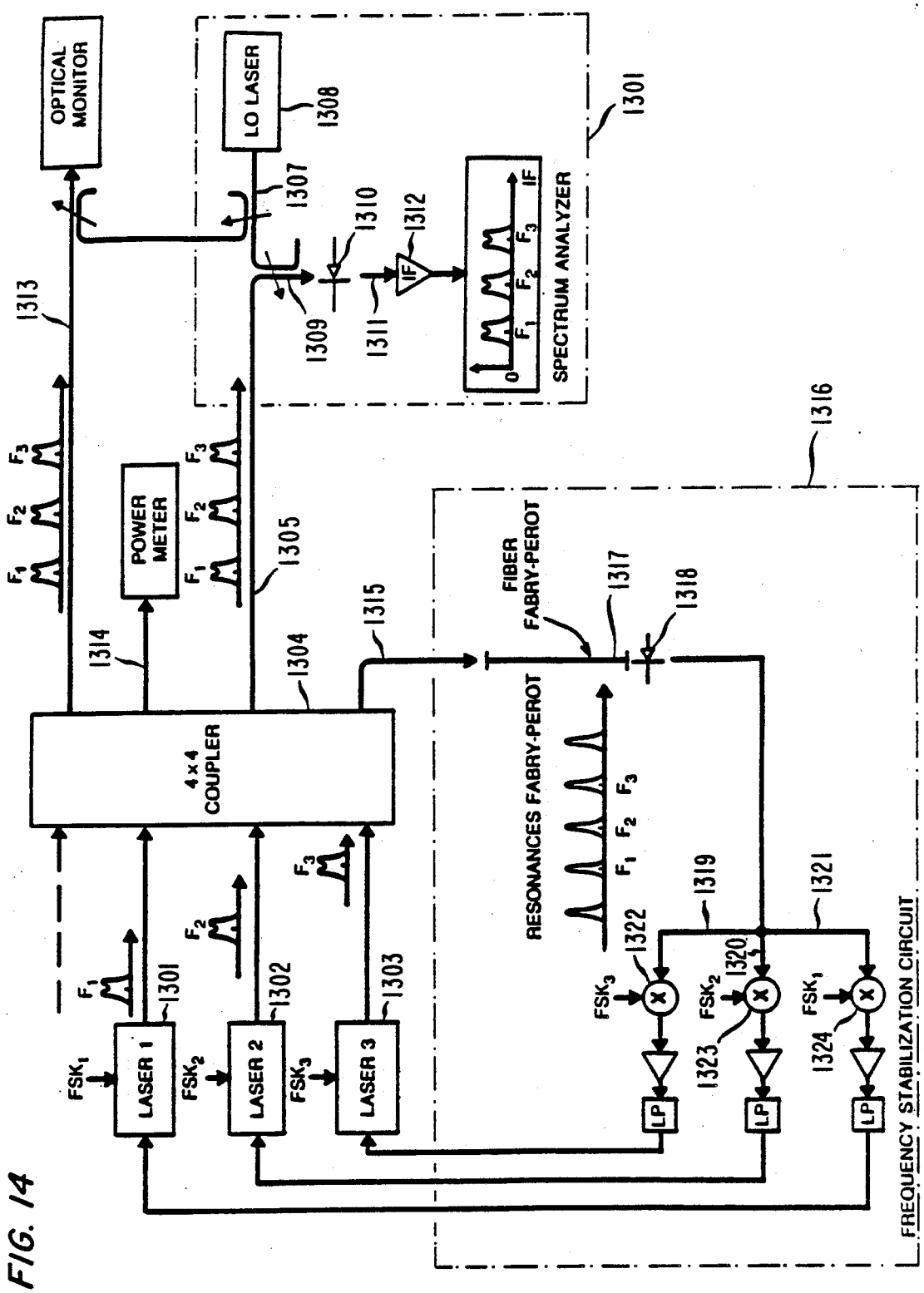
FIG. 14 is a detailed circuit schematic of an embodiment of the invention in which an entire comb of frequencies is stabilized by locking the comb to the resonances of a single Fabry Perot cavity.

An exemplary circuit for the practice of this embodiment of the invention is shown in FIG. 14. The three optical sources, 1301, 1302 and 1303, are fast frequency-tunable external cavity lasers providing a single-frequency signal around 1.28 $\mu$m that can be frequency-tuned over several thousand of GHz as well as frequency-modulated up to 100 Mb/s. See, for example, B. Glance et-al, *Electronics Letters*, Vol. 22, No. 3, pp. 98–99, Jan. 1987. The optical sources are tuned to different frequencies, spaced by a frequency interval that an be varied from zero MHz to several tens of GHz. As shown in the figure, each laser is Frequency Shift Keyed (FSK) at 45 Mb/s by an independent random NRZ bit stream. The modulation index is equal to about one. The three optical signals are multiplexed by a 4×4 optical coupler, 1304. Each of the 4 output fibers of the coupler carries the three FDM signals. For analysis, the multiplexed signal from one of the fibers 1305 may be transposed from the optical domain to the IF domain at 1306. The multiplexed signal on 1305 is combined at 1309 with the optical signal 1307 from a tunable external-cavity laser 1308. See, for example, R. Wyatt et al, *Electronics Letters*, Vol. 19, No. 3, pp. 110–112, Feb. 1983. The resulting signal is detected by a photodiode 1310 yielding an IF signal 1311 which can be observed with an IF spectrum analyzer 1312. Two other output fibers 1313 and 1314 are used, respectively, to monitor the optical signals and to measure the signal power. The fourth output fiber 1315 is connected to the frequency stabilization circuit, 1316.

Figure 15:
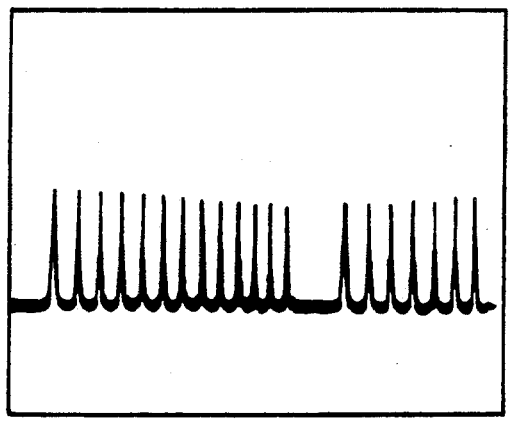
FIGS. 15-17 are representations of specific signals obtained using the circuit of FIG. 14.

The Fabry-Perot 1317 consists of a piece of single mode fiber 20 cm long, whose two ends are coated with a partially transmitting thin film mirror, spliced into a regular section of fiber by two rotary connectors. As shown in FIG. 15, the Fabry-Perot resonator provides a comb of resonances equally-spaced by 500 MHz with a 3 dB b and width of about 50 MHz. See, for example, J. Stone, *Electronics Letters*, Vol. 21, No. 11, pp. 504–505, May 1985. One end of the regular section of fiber is connected to one of the outputs 1315 of the 4×4 optical coupler; the other end illuminates a photodetector 1318.

Figure 16:
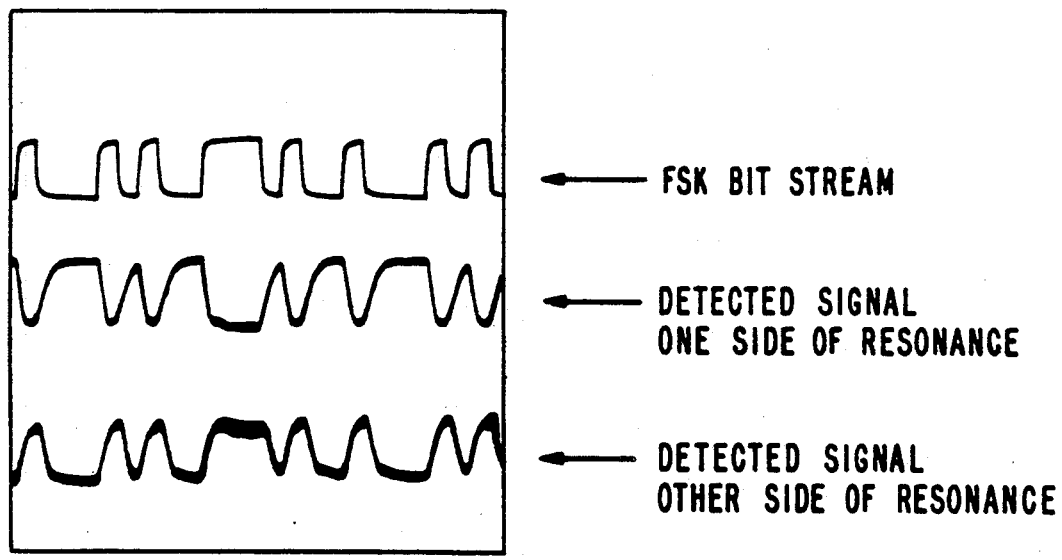

The error signal needed to frequency-lock the optical sources is generated as follows: As an optical source drifts from the peak of a Fabry-Perot resonance, the photodiode detects a baseband signal having the same pattern as the FSK bit stream modulating the optical source. However, the polarity of the detected pattern relative to that used to FSK the laser depends on which side of the resonance the frequency drift occurred. This effect is illustrated in FIG. 16, in which is shown compared a modulating FSK bit stream to the detected signals for the laser frequency tuned to each side of the peak of a Fabry-Perot resonance. Thus, an error signal can be obtained by multiplying the FSK bit stream by the detected signal and filtering the resulting amplified product by a low-pass filter. See, for example, R. V. Pound, *Radiation Laboratory Series* 16 pp. 342–347, McGraw-Hill, New York, 1948. The error signal is then used to lock the laser frequency to the selected Fabry-Perot resonance.

In the present case, three independent error signals are obtained from the same photodiode current. This is achieved by dividing the photodiode signal into three parts 1319, 1320 and 1321, each feeding a balanced-mixer 1322, 1323 and 1324, respectively. The second input of this device is fed by one of the three different FSK modulating signals as shown (FSK$_1$, FSK$_2$ and FSK$_3$). Therefore, each balanced mixer acts as a correlator, comparing a given FSK modulating signal to the presence of a similar pattern detected by the photodiode. As a result, each balanced mixer yields an error signal depending only on the frequency drift of one laser. The three lasers can thus be frequency-locked, independently, to any of the resonances of the Fabry-Perot resonator.

The above frequency stabilization circuit can be generalized to an FDM system having a large number of optical sources, all of which are frequency-stabilized to the resonances of a single Fabry-Perot resonator.

Figure 17:
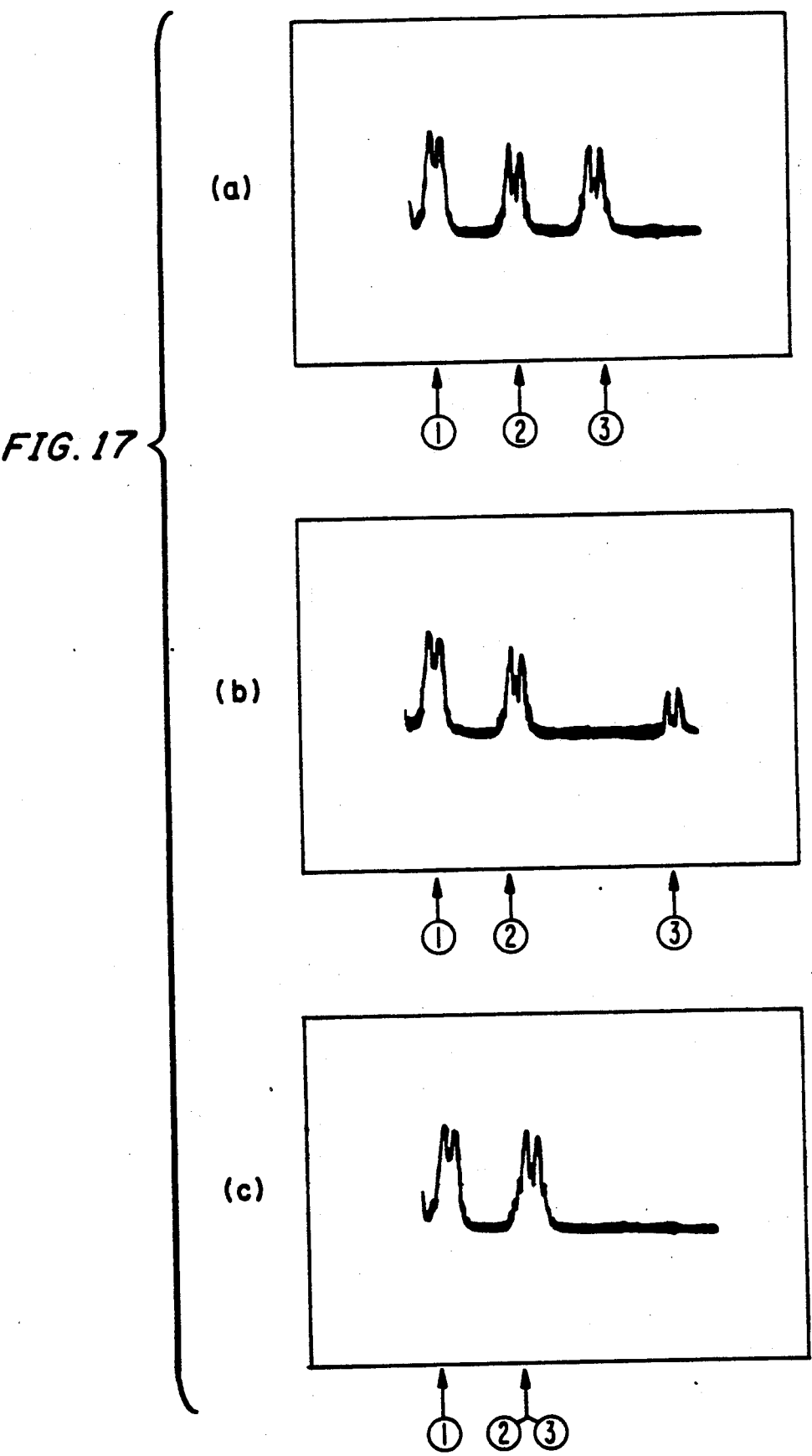

The three FDM optical signals may be heterodyned from the optical domain to the IF domain to observe frequency-locking of the three power spectra by means of an IF spectrum analyzer. FIG. 17 shows three photos; photo "a" represents the three power spectra (defined as #1, #2 and #3) frequency-locked to three adjacent resonances (spaced by 500 MHz) of the Fabry-Perot resonator. Photo "b" shows the spectra #1 and #2 frequency-locked to two adjacent resonances while spectrum #3 is locked two resonances away (1000 MHz) from spectrum #2 (amplitude differences between the spectra are due to the variable response of the IF amplifier of the heterodyne receiver). Finally, photo "c" shows spectra #2 and #3 locked to the same resonance, one resonance away (500 MHz) from spectrum #1.

Similar results cannot be displayed for frequency spacing larger than three resonances because of the limited bandwidth of the IF receiver. However, frequency-locking can be observed by monitoring the optical signals through a scanning Fabry-Perot etalon. In this case, the three optical signals were frequency-locked independently to any of the resonances of a large set of resonances of the fiber Fabry-Perot.

Frequency-locking is very robust. The laser frequency remains locked to the selected Fabry-Perot resonance when the laser external cavity is tuned to yield a free-running laser frequency variation up to ±2.2 GHz. A larger tuning of the external cavity causes the laser frequency to jump and lock to the next Fabry-Perot resonance. Another interesting feature provided by the frequency control circuit is the possibility of measuring accurately the frequency spacing between locked optical signals. This can be done simply by counting the number of resonances between the signals as the frequency of one signal is tuned across the comb of the Fabry-Perot resonances.

What is claimed is:

1. An optical communication system to process at least three intelligence-bearing, frequency-multiplexed, modulated optical signals comprising:
   means for frequency multiplexing the at least three signals,
   at least one Fabry-Perot cavity with resonances at the frequencies of the at least three signals and with which cavity the signals interact,
   means for applying a dithering frequency to at least one of the at least three signals to yield at least one dithered signal,
   a feedback loop associated with the at least one dithered signal to generate an error signal proportional to drifting of at least one detected parameter of the at least one dithered signal, and
   means for adjusting a device in response to the error signal.

2. The communications system of claim 1 comprising at least two Fabry-Perot cavities, and in which system one of the signals is a reference signal, and the said feedback loop is connected to detect drift in the detected reference signal.

3. The communications system of claim 2 in which there is a feedback loop associated with each of the Fabry-Perot cavities to detect drift in the detected reference signal at each of the Fabry-Perot cavities.

4. The communications system of claim 3 in which the signals are transmitted through at least one of the Fabry-Perot cavities.

5. The communications system of claim 3 in which the signals are reflected of at least one of the Fabry-Perot cavities.

6. The communications system of claim 1 in which there exist cavity resonances at the frequencies of each of the signals.

* * * * *